United States Patent
Shibuya

(10) Patent No.: US 7,006,693 B2
(45) Date of Patent: Feb. 28, 2006

(54) OBJECT RECOGNITION METHOD

(75) Inventor: Satoru Shibuya, Kyoto (JP)

(73) Assignee: Giken Trastem Co., Ltd., Kyoto (JP)

( * ) Notice: Subject to any disclaimer, the term of this patent is extended or adjusted under 35 U.S.C. 154(b) by 638 days.

(21) Appl. No.: 09/908,911

(22) Filed: Jul. 19, 2001

(65) Prior Publication Data

US 2002/0009228 A1    Jan. 24, 2002

(30) Foreign Application Priority Data

Jul. 19, 2000    (JP)    ............................... 2000-219581

(51) Int. Cl.
*G06K 9/46*    (2006.01)

(52) U.S. Cl. ................. 382/191; 356/499; 375/240.19; 382/199; 382/203; 382/280

(58) Field of Classification Search ................ 382/191, 382/195, 196, 197, 199, 201, 203, 211, 243, 382/280, 281; 356/450, 490, 499; 375/240.18, 375/240.19, 240.2, 240.22; 359/238, 489
See application file for complete search history.

(56) References Cited

U.S. PATENT DOCUMENTS

| | | | | |
|---|---|---|---|---|
| 4,747,152 A | * | 5/1988 | Knutsson et al. ........... 382/197 |
| 5,175,775 A | * | 12/1992 | Iwaki et al. ................ 382/211 |
| 5,227,862 A | * | 7/1993 | Oshida et al. .............. 356/490 |
| 5,619,596 A | * | 4/1997 | Iwaki et al. ................ 382/278 |
| 5,724,447 A | * | 3/1998 | Fukushima ................. 382/211 |
| 5,731,778 A | * | 3/1998 | Nakatani et al. .............. 342/70 |
| 5,748,314 A | * | 5/1998 | Kitayoshi ................... 356/450 |
| 5,836,872 A | * | 11/1998 | Kenet et al. ................ 600/306 |
| 5,901,249 A | * | 5/1999 | Ito ............................. 382/239 |
| 5,917,940 A | * | 6/1999 | Okajima et al. ............ 382/173 |
| 6,002,794 A | * | 12/1999 | Bonneau et al. ............ 382/166 |
| 6,173,275 B1 | * | 1/2001 | Caid et al. .................... 706/14 |
| 6,266,452 B1 | * | 7/2001 | McGuire .................... 382/294 |
| 6,320,648 B1 | * | 11/2001 | Brueck et al. ................ 355/67 |
| 6,344,930 B1 | * | 2/2002 | Kaneko et al. ............. 359/666 |
| 6,369,932 B1 | * | 4/2002 | Gerchberg ................. 359/237 |
| 6,373,970 B1 | * | 4/2002 | Dong et al. ................. 382/128 |
| 6,421,629 B1 | * | 7/2002 | Ishiyama .................... 702/159 |
| 6,453,074 B1 | * | 9/2002 | Zheng ........................ 382/260 |
| 6,501,861 B1 | * | 12/2002 | Cho et al. ................... 382/243 |
| 6,614,847 B1 | * | 9/2003 | Das et al. .............. 375/240.16 |
| 6,674,905 B1 | * | 1/2004 | Matsugu et al. ............ 382/199 |
| 6,754,398 B1 | * | 6/2004 | Yamada ..................... 382/260 |
| 6,873,712 B1 | * | 3/2005 | Shibuya ..................... 382/103 |

* cited by examiner

*Primary Examiner*—Bhavesh M. Mehta
*Assistant Examiner*—Gregory Desire
(74) *Attorney, Agent, or Firm*—Koda & Androlia

(57) ABSTRACT

The object of the present invention is to quickly and easily recognize the position, quantity, and kind of the object, which takes unspecified forms according to the angle in which the object is positioned. Points are arranged at regular intervals on an image. For each respective point, a fundamental wave Fourier transformation is calculated on the respective pixel values on the circumference of a circle whose center is at the point. The phase obtained by the fundamental wave Fourier transformation is a normal vector of the point. From the normal vector groups of every point arranged at regular intervals the object is recognized.

1 Claim, 3 Drawing Sheets

OBJECT RECOGNITION METHOD

BACKGROUND OF THE INVENTION

1. Field of the Invention

The present invention relates to the technological field of object recognition methods which recognize objects from an image. More particularly, the present invention is a method of object recognition by determining the normal line direction of the outline of the object and classifying and recognizing humans, cars, and vegetables etc. in real-time.

2. Prior Art

Conventionally for the Texture Analysis, a Fourier transformation is utilized to analyze the grayscale picture. The Fourier transformation for the image generally is utilized to analyze the state of the surface of the object shown in the image. In this case, the images are divided into square regions, and a Fourier transformation is performed on the image data of respective square regions and the crystal lattice direction and defects etc. of the object are analyzed according to the obtained phase. Again, in this case a Fourier transformation is performed on the square regions, so the obtained phase becomes a vertical or horizontal directional vector of the square region. Therefore, by using this method there is a need for an even greater calculation to determine the normal line direction for the outline of the object in order to recognize an object with an unspecified form in the image. Moreover, since the images are divided into squares, depending on the position of the boundary of the image and the position where the square is arranged, the normal vector of the object may not be obtained accurately. In order to reduce this effect, a window function is applied on the outer part of the squared region. As a result, the calculation time becomes longer.

On the other hand, image processing in real-time, for instance, to recognize a moving object with an unspecified shape such as a human, the differential image or phase difference of the present image and the prior image is utilized. This prior method is used to estimate the number of people etc. based on the area of the region by detecting a density difference more than the set level from the differential image etc. However, in this method, the recognition of objects are determined based on difference area, so it can not be avoided that it may recognize an object incorrectly, for instance, it may recognize one large person as two people, or two small people moving in the same direction side by side as one person.

SUMMARY OF THE INVENTION

The object of this present invention is to recognize quickly and easily the position, quantity and kind of the object which takes different forms when taken from different positions, angles, etc.

The method provided to overcome the problem includes:
- arranging points equally spaced on the image,
- calculating a fundamental wave Fourier transformation on the pixel values which are on the circumference of the circle where center is the point,
- obtaining the phase from the fundamental wave Fourier transformation for the normal vector of the point, and
- recognizing the object from the normal vector group of every point.

When a fundamental wave Fourier transformation is performed on the respective pixel values on the circumference and a dark or light shade of the image exists in the circumference, the phase of the dark or light direction is determined. This phase becomes the normal vector of the center of the circle. The dark or light shade of the image is detected as the boundary of the object and the background in the region. Therefore, determine all the normal vectors of the respective points positioned at equal intervals on the image. From the normal vector group the existence of the boundary of the object and the background on the region and the direction is recognized, so the position, quantity and kind of the object in the image can be recognized.

In this technical method, when the value (pow) which is the square root of the square sum of the value (SV) (which is the product sum of the sine wave of the fundamental wave Fourier transformation) or the value (CV) (which is the product sum of the cosine wave of the fundamental wave Fourier transformation) is below a certain level, this point is regarded not to have a normal vector. Alternately, when the sum of the absolute value of SV and CV is below a certain level, this point is regarded as not having a normal vector. It is considered that there is no brightness gradient (density) in the circumference of the circle whose center is this point so it will be recognized as an image with a flat density with a background image where no object exists, or as an image inside the object. As a result, there is no need to calculate the normal vector for this point and thus the object in the image can be recognized more quickly and precisely.

As stated above, according to the present invention in order to recognize an object shown on a grayscale picture, the phase of the result of the fundamental wave Fourier transformation is performed circularly. In other words, utilizing the normal vectors makes it possible to quickly and easily recognize the position, quantity and kind of the object.

DETAILED DESCRIPTION OF THE INVENTION

Figure 1:
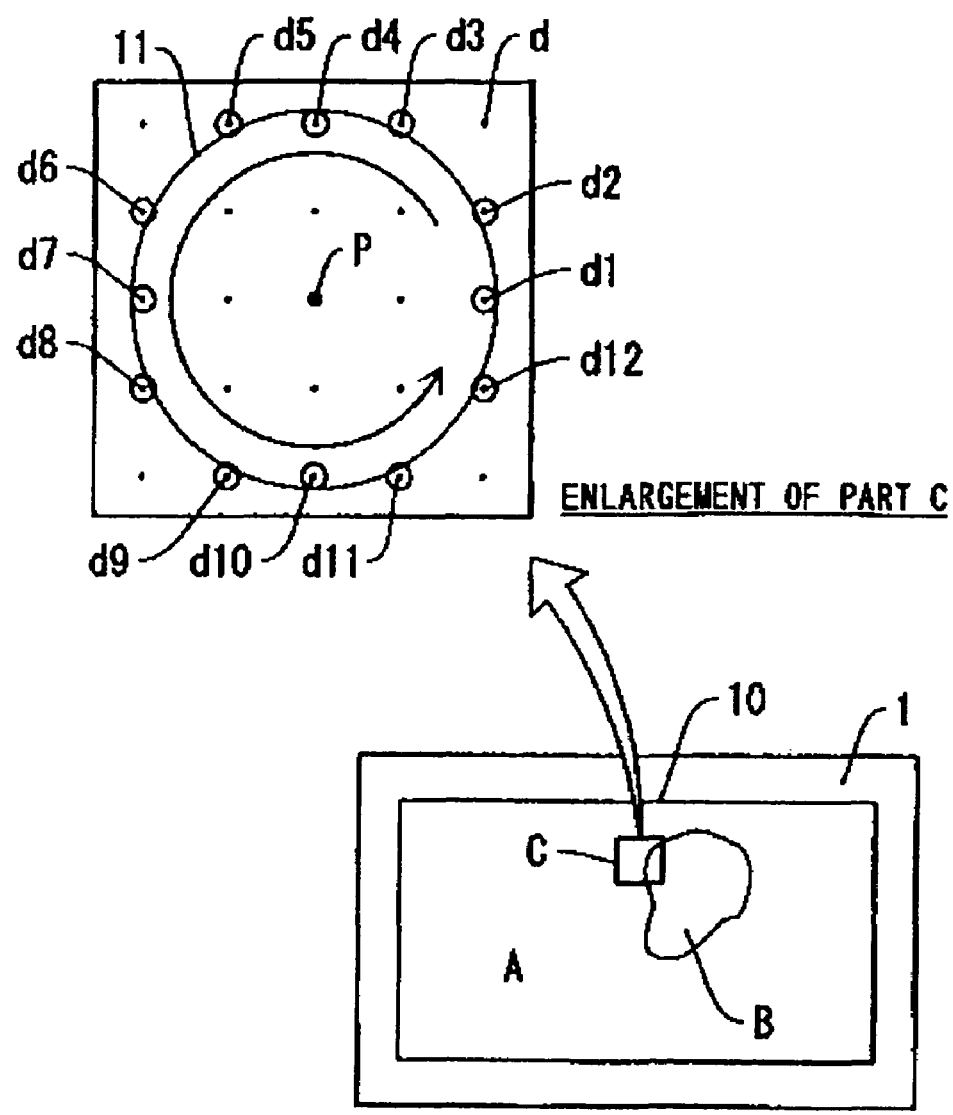
FIG. 1 is a diagram showing the image converted into digital data in the embodiment.

FIG. 1 is a diagram, which shows the image converted into digital data.

As FIG. 1 shows, the embodiment of the object recognition method recognizes by utilizing the density difference of object B and background A shown in the image 1 converted into digital data. First, arrange points p at equal intervals on the image 1. In other words for the necessary regions 10 (generally the whole image region) on image 1, for instance, arrange points p two picture elements equally spaced horizontally and vertically. These points p can be predetermined fixed points. Note that d, d1 through d12 and p in FIG. 1 all indicate picture elements. The image, for example, a screen, etc. of 320 picture elements horizontally and 240 picture elements vertically can be used. For these respective picture elements, when an object is shown on the image, the image density differs for instance in brightness from 0 through 255 (256-level).

Next, a fundamental wave Fourier transformation is calculated on the pixel value of each picture element on the circumference of the circle whose center is point p. For example, for the circle 11, draw a circle 11 with the radius of two picture elements and on each 12 points (d1 through d12) on the circumference calculate a fundamental wave Fourier transformation.

Accordingly, SV and CV are determined using the following equations:

$$SV=\Sigma_n d_n \cdot \sin((n-1)/N \cdot 2\pi) \qquad (3)$$

$$CV=\Sigma_n d_n \cdot \cos((n-1)/N \cdot 2\pi) \qquad (4)$$

In Equations (3) and (4), $\Sigma_n$ indicates the sum of n=1 through N.

The points d1 through d12 on the circumference can be taken from a prescribed base line and by successively marking the points counter clockwise along the circumference, or by applying a window function on the squared region so it becomes a circle or circular shape. The method of how the points are to be taken is optional. The intervals of the adjacent points p are 2 picture elements, and the radius of circle 11 is 2 picture elements therefore the adjacent respective circles 11 overlap every 2 picture elements. The fundamental wave Fourier transformation as Equation (1) below shows, for the 12 points d1 through d12, the phase (sita) is determined from the arc tangent (ATAN) which utilizes the value (SV) which is the product sum of the sine wave of the fundamental wave Fourier transformation and the value (CV) which is the product sum of the cosine wave of the fundamental wave Fourier transformation. Note that, the term "fundamental wave" refers to the sine wave and cosine wave where the length of one period is equal to the length of the circumference which center is said point p.

Equation (1)

$$\text{sita}=\text{ATAN}(SV/CV) \qquad (1)$$

The phase (sita) obtained from said Equation (1) becomes the normal line direction (normal vector) of the point p. The phase (sita) is to be determined for every point p arranged at regular intervals.

Figure 3A:
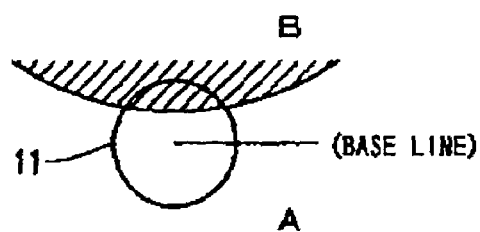
FIG. 3(a) is a diagram showing the circle placed on the boundary of the object image and the background image and from the base line mark the points in the counter clockwise direction.
Figure 3B:
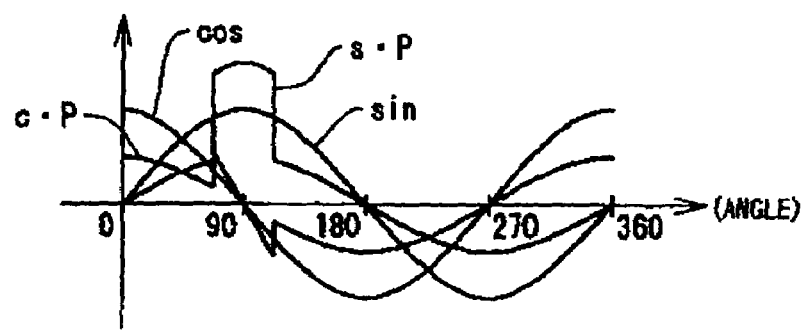
FIG. 3(b) is a diagram showing the sine wave, cosine wave, s·p wave shape and c·p wave shape when the base line is the 0 degree angle.
Figure 3C:
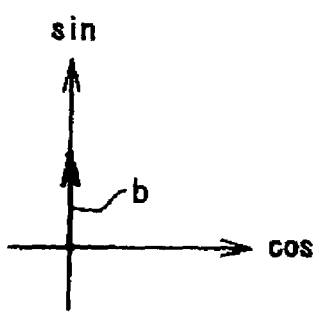
FIG. 3(c) is a diagram which shows the result of the phase direction.

Now when object B is situated overlapping circle 11 as shown in FIG. 3(a), from the base line shown in the same FIG. 3(a), turn in the counter clockwise direction and multiply the respective points d1 through d12 to the sine wave and cosine wave, and the wave shape becomes like FIG. 3(b). In other words, as shown in FIG. 3(b) the wave shape s·p which is the sine wave and pixel value multiplied, is the set positive peak, which appears near the 90 degree angle where object B overlaps, and the wave shape c·p which is the cosine wave and pixel value multiplied, appears as the positive peak and the negative peak near the 90 degree angle. In addition, wave shape s·p at which a peak appears in the positive 90 degree angle, the SV value which is the sum of the wave shape s·p is positive. Whereas the wave shape c·p both have an identical peak with only the positive and negative differing at the 90 degree angle cancel out, so the CV value which is the sum of this wave shape c·p is 0. As a result, the phase obtained from the fundamental wave Fourier transformation from Equation (1), appears at the 90 degree angle shown in FIG. 3(c), and this is exactly the normal vector for the outline of object B.

However, when the density of the image is flat, so that the normal vector is invalid (it is recognized as a background image A without object B existing, or as an image inside object B), in order to remove the points p which are below a fixed level, as shown in the Equation (2) below, when the value (pow) is below the fixed value, it is considered that there is no normal vector for point p. For instance, in the case when images are obtained in the range of brightness for the values 0 through 255 (256-level), set the fixed value when the value is below a corresponding brightness difference of 8 through 10, and consider that there is no normal vector for the point.

Equation (2)

$$\text{pow}=\text{SQRT}(SV \times SV + CV \times CV) \qquad (2)$$

According to the equation above it is not necessary to calculate the normal vector based upon Equation (1) for point p where the density is flat, therefore the object in the image can be recognized more quickly and more precisely.

Figure 2:
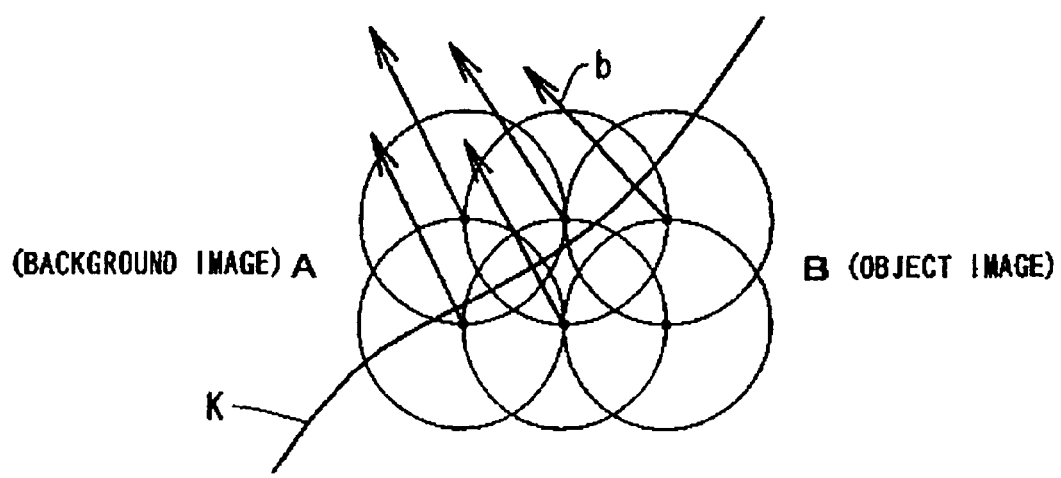
FIG. 2 is a diagram showing the image of normal vector b.

From the results obtained from the Equation (1) and Equation (2), for example, a normal vector b shown in FIG. 2 can be obtained.

In the above embodiment, point p is arranged 2 picture elements equally spaced in both the horizontal and vertical direction on the image. The circle 11 whose the center is the respective points p, forms a circle 11 with a radius of 2 picture elements, and a Fourier transformation is performed on the 12 pixel values on the circumference of the circle 11, so the adjacent respective circles 11 overlap every 2 picture elements. As a result, the recognition of the object can be done in high resolution in situations where the normal vector b exists.

In this way the existence of the boundary K of object B and background A on a region is recognized from the normal vector group which is the aggregate of the normal vector b of every point p arranged at equal intervals. Therefore, using this method, the normal vector b obtained by calculating a fundamental wave Fourier transformation circularly, is not to determine the strict boundary K of object B on image 1, but in the case when the normal vector group of the point p adjacent to another point p points toward the same direction, the brightness gradient (density) of the region with many points p, is understood as the normal vector group direction (refer to FIG. 2). Therefore, the phase of the result of the fundamental wave Fourier transformation is performed circularly; in other words, normal vector b is utilized and thus the calculation is done more quickly and easily, so the position, quantity, and kind of the object B in image 1 is recognized. Therefore, according to this method, in order to recognize and classify the object B (a person, car or vegetable etc.), the images taken by a television camera in natural light make it possible to recognize the object B quick enough so as to withstand real-time processing using an inexpensive apparatus.

In the embodiment above, points p are to be arranged two picture elements apart at equal intervals on the image 1, however it is possible to set it at, e.g. 3 picture elements or 4 picture elements. However in this case, the circle with the concerned point p as the center, the radius must be set and drawn to overlap with the adjacent circle.

Furthermore, the phase is determined from the Equation (1); however, it can also be calculated by determining the approximate value by referring to a table based on the ratio of the SV value and CV value, which can also be obtained with enough precision.

Moreover, in the Equation (2) wherein the square root of the square sum of the SV value and CV value is used, instead the pow can be substituted by utilizing the absolute value sum of the SV value and CV value.

What is claimed is:

1. An object recognition method, which recognizes objects by utilizing the density difference of the object and the background area shown on an image, said method comprising:

arranging points p at equal intervals on said image, for said respective point p, performing a fundamental wave Fourier transformation for each pixel value on a circumference of a circle which center is point p, handling a phase obtained from said fundamental wave Fourier transformation as the normal vector of said point p, recognizing said object from the normal vector group of every said points p arranged at equal intervals, and judging that a normal vector does not exist for a point p when a value of a square root of a square sum of a value SV (which is the product sum of the sine wave of the fundamental wave Fourier transformation), and a value CV (which is the product sum of the cosine wave of the fundamental wave Fourier transformation) is below a fixed value or when a sum of an absolute value of said SV and said CV is below a fixed value.

* * * * *